(12) United States Patent
Wasserblat et al.

(10) Patent No.: US 9,858,923 B2
(45) Date of Patent: Jan. 2, 2018

(54) DYNAMIC ADAPTATION OF LANGUAGE MODELS AND SEMANTIC TRACKING FOR AUTOMATIC SPEECH RECOGNITION

(71) Applicant: INTEL CORPORATION, Santa Clara, CA (US)

(72) Inventors: Moshe Wasserblat, Maccabim (IL); Oren Pereg, Amikam (IL); Michel Assayag, Shoham (IL); Alexander Sivak, Haifa (IL); Shahar Taite, Kfar Saba (IL); Tomer Rider, Naahryia (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/864,456

(22) Filed: Sep. 24, 2015

(65) Prior Publication Data

US 2017/0092266 A1 Mar. 30, 2017

(51) Int. Cl.
*G10L 15/00* (2013.01)
*G06F 17/00* (2006.01)
*G10L 15/18* (2013.01)
*G10L 15/06* (2013.01)
*G10L 15/10* (2006.01)

(52) U.S. Cl.
CPC ........ *G10L 15/1815* (2013.01); *G10L 15/063* (2013.01); *G10L 15/10* (2013.01); *G10L 2015/0631* (2013.01)

(58) Field of Classification Search
None
See application file for complete search history.

(56) References Cited

U.S. PATENT DOCUMENTS

| 7,209,880 B1 * | 4/2007 | Gajic | G10L 15/20 704/200 |
| 7,216,077 B1 * | 5/2007 | Padmanabhan | G10L 15/065 704/240 |

(Continued)

FOREIGN PATENT DOCUMENTS

EP 2506252 A2 10/2012

OTHER PUBLICATIONS

International Search Report and Written Opinion issued in PCT/US2016/046162, dated Nov. 17, 2016, 10 pages.

*Primary Examiner* — Fariba Sirjani
(74) *Attorney, Agent, or Firm* — Grossman, Tucker, Perreault & Pfleger, PLLC (57) ABSTRACT

Generally, this disclosure provides systems, devices, methods and computer readable media for adaptation of language models and semantic tracking to improve automatic speech recognition (ASR). A system for recognizing phrases of speech from a conversation may include an ASR circuit configured to transcribe a user's speech to a first estimated text sequence, based on a generalized language model. The system may also include a language model matching circuit configured to analyze the first estimated text sequence to determine a context and to select a personalized language model (PLM), from a plurality of PLMs, based on that context. The ASR circuit may further be configured to re-transcribe the speech based on the selected PLM to generate a lattice of paths of estimated text sequences, wherein each of the paths of estimated text sequences comprise one or more words and an acoustic score associated with each of the words.

15 Claims, 9 Drawing Sheets

(56) References Cited

U.S. PATENT DOCUMENTS

| | | | |
|---|---|---|---|
| 7,725,318 B2* | 5/2010 | Gavalda | G06F 17/30684 704/245 |
| 7,933,774 B1* | 4/2011 | Begeja | G10L 15/063 704/231 |
| 8,543,398 B1* | 9/2013 | Strope | G10L 15/063 704/235 |
| 8,694,305 B1* | 4/2014 | Grove | G06F 17/28 704/1 |
| 8,818,808 B2* | 8/2014 | Hakkani-Tur | G10L 15/063 704/243 |
| 8,831,947 B2* | 9/2014 | Wasserblat | G10L 15/08 704/231 |
| 8,996,371 B2* | 3/2015 | Hurvitz | G10L 15/183 704/10 |
| 9,424,840 B1* | 8/2016 | Hart | G10L 15/22 |
| 2001/0051872 A1* | 12/2001 | Kagoshima | G10L 13/10 704/260 |
| 2003/0055655 A1* | 3/2003 | Suominen | G10L 15/22 704/276 |
| 2004/0158469 A1* | 8/2004 | Brand | G06F 17/30705 704/240 |
| 2004/0193401 A1* | 9/2004 | Ringger | G06F 17/2715 704/9 |
| 2004/0236575 A1* | 11/2004 | Goronzy | G10L 15/08 704/231 |
| 2005/0038644 A1* | 2/2005 | Napper | G06F 17/242 704/9 |
| 2005/0144004 A1* | 6/2005 | Bennett | G06F 17/3043 704/270.1 |
| 2005/0182628 A1* | 8/2005 | Choi | G10L 15/08 704/252 |
| 2006/0074656 A1* | 4/2006 | Mathias | G10L 15/063 704/243 |
| 2006/0129397 A1* | 6/2006 | Li | G10L 15/19 704/245 |
| 2006/0212897 A1* | 9/2006 | Li | H04H 60/58 725/32 |
| 2007/0100618 A1* | 5/2007 | Lee | G10L 15/1822 704/238 |
| 2007/0106512 A1 | 5/2007 | Acero et al. | |
| 2007/0143112 A1* | 6/2007 | Yu | G10L 15/08 704/257 |
| 2007/0271086 A1 | 11/2007 | Peters et al. | |
| 2008/0120091 A1* | 5/2008 | Waibel | G06F 17/289 704/2 |
| 2009/0125501 A1* | 5/2009 | Gao | G06F 17/2715 |
| 2010/0023320 A1 | 1/2010 | Di Cristo et al. | |
| 2010/0070280 A1* | 3/2010 | Yu | G10L 15/142 704/256.2 |
| 2010/0256977 A1* | 10/2010 | Yu | G06K 9/6277 704/240 |
| 2011/0077943 A1* | 3/2011 | Miki | G10L 15/183 704/250 |
| 2011/0153324 A1* | 6/2011 | Ballinger | G10L 15/30 704/235 |
| 2011/0200229 A1* | 8/2011 | Tuzel | H04N 19/597 382/103 |
| 2012/0053935 A1* | 3/2012 | Malegaonkar | G10L 15/07 704/235 |
| 2012/0059653 A1* | 3/2012 | Adams | G10L 15/19 704/243 |
| 2012/0065961 A1* | 3/2012 | Latorre | G10L 13/08 704/9 |
| 2012/0084086 A1* | 4/2012 | Gilbert | G10L 15/32 704/235 |
| 2012/0095766 A1* | 4/2012 | Han | G10L 15/197 704/255 |
| 2012/0143605 A1* | 6/2012 | Thorsen | G10L 15/183 704/235 |
| 2012/0197894 A1* | 8/2012 | Noh | G06F 17/2745 707/737 |
| 2012/0253811 A1* | 10/2012 | Breslin | G10L 17/00 704/249 |
| 2013/0018649 A1* | 1/2013 | Deshmukh | G10L 15/26 704/9 |
| 2013/0018650 A1* | 1/2013 | Moore | G06F 17/2818 704/9 |
| 2013/0030804 A1* | 1/2013 | Zavaliagkos | G10L 15/26 704/235 |
| 2013/0211822 A1* | 8/2013 | Sakal | G10L 15/1815 704/9 |
| 2013/0262106 A1 | 10/2013 | Hurvitz et al. | |
| 2014/0257794 A1 | 9/2014 | Gandrabur et al. | |
| 2014/0372120 A1* | 12/2014 | Harsham | G10L 15/22 704/251 |
| 2015/0032443 A1* | 1/2015 | Karov | G06F 17/2785 704/9 |
| 2015/0058018 A1* | 2/2015 | Georges | G10L 15/08 704/257 |
| 2015/0066502 A1* | 3/2015 | Achituv | G10L 15/07 704/235 |
| 2015/0120288 A1* | 4/2015 | Thomson | G10L 15/22 704/231 |
| 2015/0228279 A1* | 8/2015 | Biadsy | G10L 15/26 704/235 |
| 2015/0254233 A1* | 9/2015 | Artzi | G06F 17/2715 704/9 |
| 2015/0279361 A1* | 10/2015 | Melamed | G10L 15/19 704/243 |
| 2015/0293920 A1* | 10/2015 | Kanjirathinkal | G06F 17/3053 707/748 |
| 2015/0370784 A1* | 12/2015 | Nissan | G06F 17/2809 704/2 |
| 2016/0104077 A1* | 4/2016 | Jackson, Jr. | G06N 99/005 706/12 |
| 2016/0104482 A1* | 4/2016 | Aleksic | G10L 15/22 704/235 |
| 2016/0336006 A1* | 11/2016 | Levit | G10L 15/063 |
| 2016/0379632 A1* | 12/2016 | Hoffmeister | G10L 15/18 704/253 |
| 2017/0092264 A1* | 3/2017 | Hakkani-Tur | G10L 15/16 |

* cited by examiner

```
┌─────────────────────────────────────────────┐
│ Transcribe speech, of a participant in a    │
│ conversation, to a first estimated text     │
│ sequence, by an automatic speech recognition│
│ (ASR) circuit. The transcription is based   │
│ on a generalized language model,            │
│                                             │
│                    810                      │
└─────────────────────────────────────────────┘
                      │
                      ▼
┌─────────────────────────────────────────────┐
│ Analyze the first estimated text sequence   │
│ to determine a context.                     │
│                                             │
│                    820                      │
└─────────────────────────────────────────────┘
                      │
                      ▼
┌─────────────────────────────────────────────┐
│ Select a personalized language model (PLM)  │
│ from a plurality of PLMs based on the       │
│ context.                                    │
│                                             │
│                    830                      │
└─────────────────────────────────────────────┘
                      │
                      ▼
┌─────────────────────────────────────────────┐
│ Re-transcribe the speech, by the ASR        │
│ circuit, based on the selected PLM to       │
│ generate a lattice of paths of estimated    │
│ text sequences. Each of the paths of        │
│ estimated text sequences comprise one or    │
│ more words and an acoustic score associated │
│ with each of the words.                     │
│                                             │
│                    840                      │
└─────────────────────────────────────────────┘
```

DYNAMIC ADAPTATION OF LANGUAGE MODELS AND SEMANTIC TRACKING FOR AUTOMATIC SPEECH RECOGNITION

FIELD

The present disclosure relates to automatic speech recognition, and more particularly, to dynamic adaptation of language models and semantic tracking to improve automatic speech recognition.

BACKGROUND

Automatic speech recognition (ASR) systems decode a stream of acoustic speech and transcribe it into a sequence of words or text. ASR systems are generally built on classifiers that use a combination of acoustic models and language models to perform that transcription. In order for the ASR system to achieve an improved level of performance, these acoustic and language models must typically be generated from training data that more closely matches the operational environment or scenario in which the ASR will be used. This may include, for example, the speaker's acoustic profile, the context of the conversation and the subject matter or content domain of the conversation. Unfortunately these factors typically vary dynamically over time and existing ASR systems are generally limited to static acoustic and language models, resulting in relatively poorer recognition performance. This is particularly true when trying to recognize conversational speech between humans, as opposed to human-to-machine speech (e.g., speaking to a smartphone digital assistant).

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for adaptation of language models and semantic tracking to improve automatic speech recognition (ASR). In some embodiments, a system for recognizing phrases of speech from a conversation may include an ASR circuit configured to transcribe a user's speech to a first estimated text sequence, based on a generalized language model. The system may also include a language model matching circuit configured to analyze the first estimated text sequence to determine a context and to select a personalized language model (PLM), from a group of available PLMs, based on that context. The ASR circuit may then re-transcribe the speech based on the selected PLM, which may provide improved results over the generalized PLM previously used. The ASR re-transcription may generate a lattice of paths of estimated text sequence possibilities. Each of the paths of estimated text sequences may include one or more words and an acoustic score associated with each of the words.

A final choice selection for the recognized conversational phrase from the lattice may be generated based on a number of factors including the scores, an estimated semantic distance between each lattice path and other previously recognized phrases from the conversation, and estimated contextual relationships between the words in each path, as will be explained in greater detail below.

Figure 1:
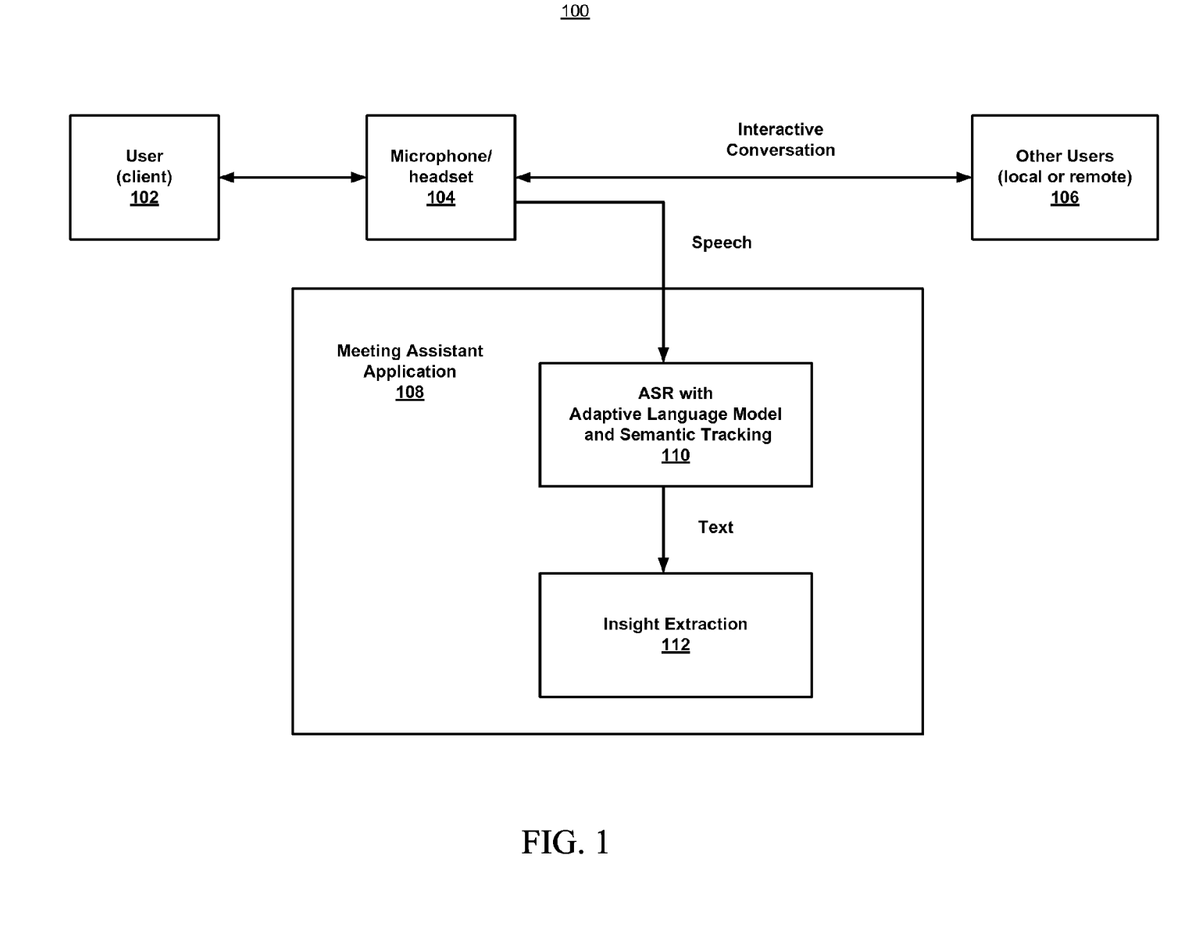
FIG. 1 illustrates a top level system diagram of an example embodiment consistent with the present disclosure.

FIG. 1 illustrates a top level system diagram 100 of one example embodiment consistent with the present disclosure. A user (or client) 102 of the system may be engaged in an interactive conversation with other users 106 who may be local or remote. The users may be participants in an online meeting, for example through Skype® or Lync®. The speech of user 102 may be recorded or otherwise sampled through a microphone 104 and provided to an ASR circuit 110 that is configured to provide adaptive language models and semantic tracking for improved recognition, as will be explained in greater detail below. The resulting text transcription of the user's speech, generated by ASR 110, may reach a level of accuracy (e.g., a sufficiently low word error rate) to enable automated insight extraction of the conversation. For example, insight extraction circuit 112 may be configured to generate conversational summaries, extract keywords, detect action requests, estimate sentiments and/or perform language translation, based on the ASR text transcription. In some embodiments, ASR circuit 110 and insight extraction circuit 112 may be incorporated in a meeting assistant application 108 configured to provide a suitable user interface to the users 102 and 106 of the system. A user interface may include, for example, video images of each user, real-time updates of text transcriptions, currently detected insights and various control mechanisms such as joining or leaving, adjusting volume, etc.

Figure 2:
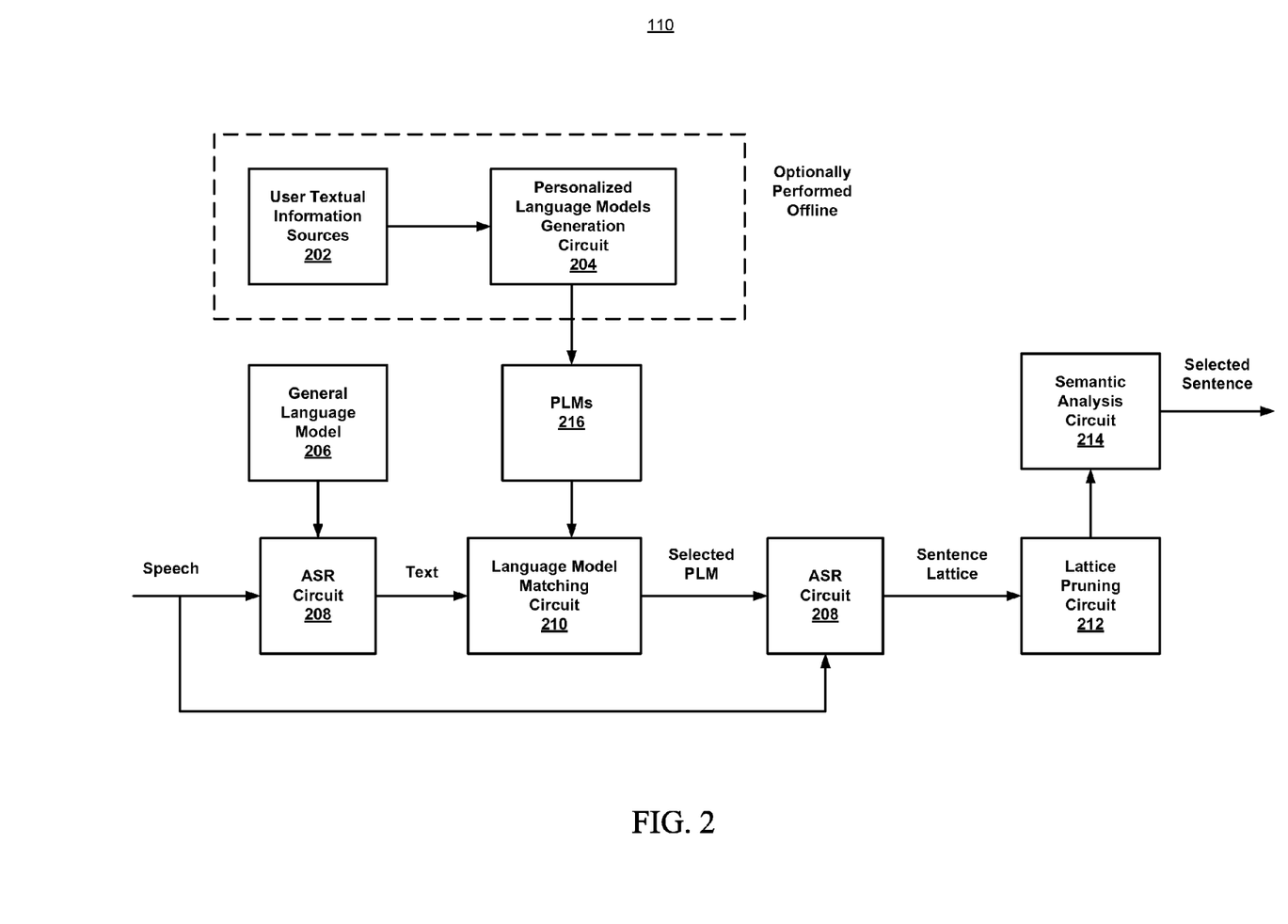
FIG. 2 illustrates a block diagram of one example embodiment consistent with the present disclosure.

FIG. 2 illustrates a block diagram of one example embodiment consistent with the present disclosure. The ASR circuit with adaptive language models and semantic tracking 110 is shown in greater detail to include a general language model 206, personalized language models (PLMs) 216, an ASR circuit 208, a language model matching circuit 210, a lattice pruning circuit 212 and a semantic analysis circuit 214, the operations of which will be explained below. Additionally, a PLM generation circuit 204 may be configured to analyze user textual information sources 202 and generate PLMs 216, the operations of which may be performed, for example, in an offline mode (e.g., prior to real-time ASR operation). PLM generation will also be explained in greater detail below.

The ASR circuit 208 is a classifier configured to transcribe speech into text based on acoustic models and language models. The acoustic model defines the speaker's acoustic profile and typically includes statistical representations of various features computed from the speech waveform, for example during a training session. The acoustic model allows the classifier to recognize sounds or phonetic components of words spoken by the user. Language models, in contrast, provide probabilities associated with sequences of words, based on known characteristics of natural language. These probabilities may be used to distinguish between similar sounding words that might otherwise be confused under a given acoustic model. The performance of the ASR (e.g., the word error rate) will generally improve if the acoustic model more closely matches the speaker's voice characteristics and if the language model more closely matches the context in which the user is speaking.

The ASR circuit 208 may be configured to perform an initial transcription of the user's speech to generate a first estimated text sequence based on a generalized language model 206. The text sequence may be a phrase or a sentence spoken by the user. The generalized language model may be designed to match language in a relatively generic context or domain.

Language model matching circuit 210 may be configured to analyze the first estimated text sequence and determine a context based on words found in that text sequence. Language model matching circuit 210 may then select a PLM, from a library or database of previously generated PLMs 216, based on the determined context. The selected PLM may be more closely matched to the current context of the user's conversational speech and therefore provide improved recognition performance.

Figure 6:
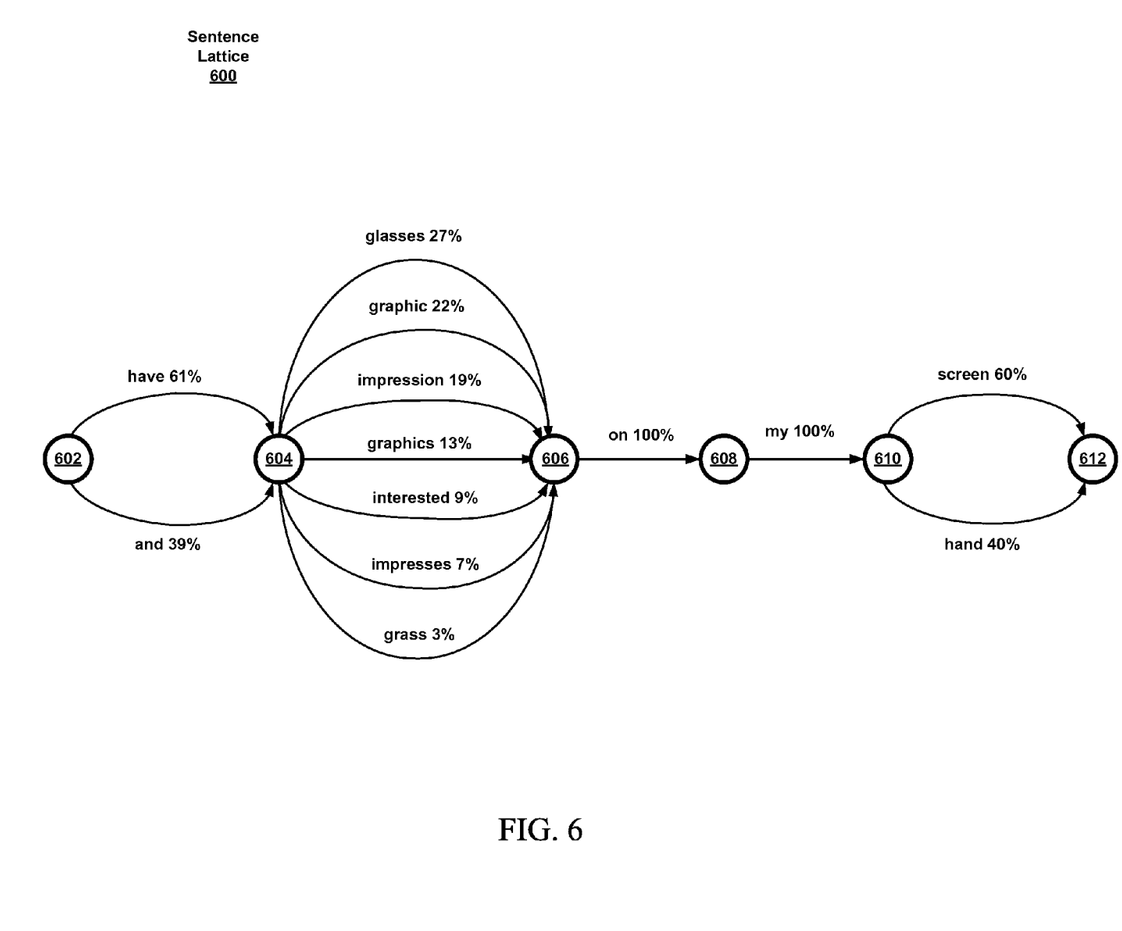
FIG. 6 illustrates a sentence lattice consistent with one example embodiment of the present disclosure.

The ASR circuit 208 may then re-transcribe the speech using the selected PLM and generate a lattice of text sequence recognition possibilities. An example of a lattice is shown in FIG. 6, which will be described in greater detail below. The lattice presents a number of paths out of which a phrase or sentence may be constructed. Each step along the path is associated with one possible word choice along with an associated acoustic score for that word choice provided by the ASR circuit. Lattice pruning circuit 212 may be configured to remove some paths from the lattice, typically paths that involve word choices with relatively lower acoustic scores. In some embodiments, lattice pruning circuit 212 may compare the acoustic scores to a threshold value and disqualify words or entire path segments if the scores fall below the threshold value.

Semantic analysis circuit 214 may be configured to analyze the lattice (or pruned lattice) and to select one of the paths of estimated text sequences as representative of the best choice for the recognized phrase or sentence from the current point in the conversation, as will be described in greater detail below.

Figure 3:
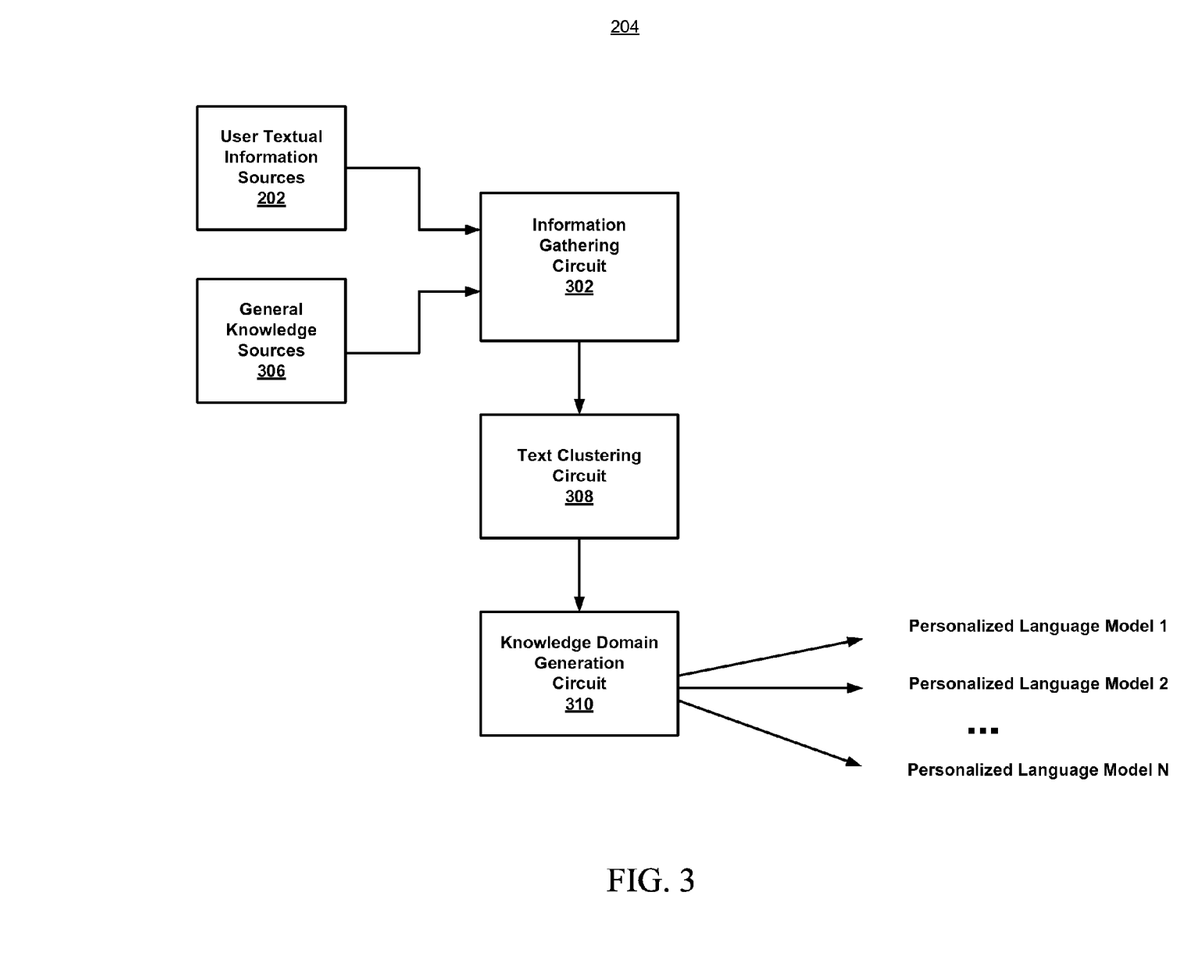
FIG. 3 illustrates a block diagram of another example embodiment consistent with the present disclosure.

FIG. 3 illustrates a block diagram of another example embodiment consistent with the present disclosure. PLM generation circuit 204 is shown in greater detail to include information gathering circuit 302, text clustering circuit 308, and knowledge domain generation circuit 310. Information gathering circuit 302 may be configured to search textual information sources associated with the user 202 and, in some embodiments, to search other general knowledge sources 306 or general personal information such as contact lists or address books. User textual information sources may include, for example, electronic documents, emails, text messages, chats, conversational recording and/or social media communications.

Figure 4:
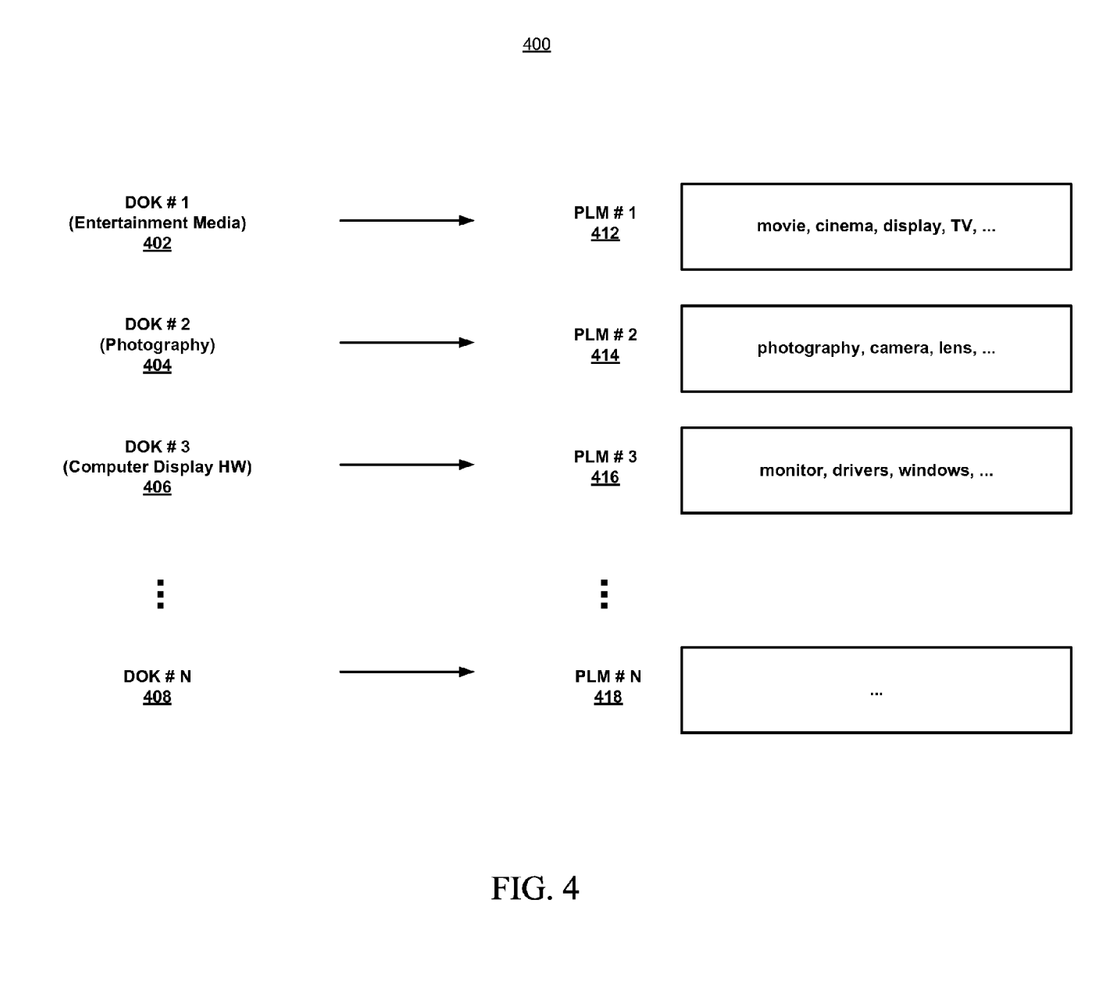
FIG. 4 illustrates language models consistent with one example embodiment of the present disclosure.

Text clustering circuit 308 may be configured to analyze the collected textual information and organize the information into clusters based on a measurement of content similarity between the sources. For example, documents or other sources with relatively high degrees of similarity may be clustered together. One example of a similarity metric may be the number of words that two documents have in common, although any other suitable metric may be used. Knowledge domain generation circuit 310 may be configured to generate domains of knowledge based on each cluster and to map those domains to various PLMs using any known statistical language modeling techniques or tools. FIG. 4 illustrates an example of this process. One cluster of textual sources may be related to a domain of knowledge, DOK #1 402, associated with entertainment media subjects. DOK #1 402 may in turn be mapped to PLM #1 412 that includes words or phrases such as "movie," "cinema," "display," and "television," etc. Continuing with this example, a second cluster of textual sources may be related to a domain of knowledge, DOK #2 404, associated with photography subjects. DOK #2 404 may be mapped to PLM #2 414 that includes words or phrases such as "photography," "camera," and "lens," etc. Similarly, a third cluster of textual sources may be related to a domain of knowledge, DOK #3 406, associated with computer display hardware subjects. DOK #3 406 may be mapped to PLM #3 416 that includes words or phrases such as "monitor," "drivers," and "windows," etc. This process may continue on for any suitable numbers of DOKs and PLMs.

Figure 5:
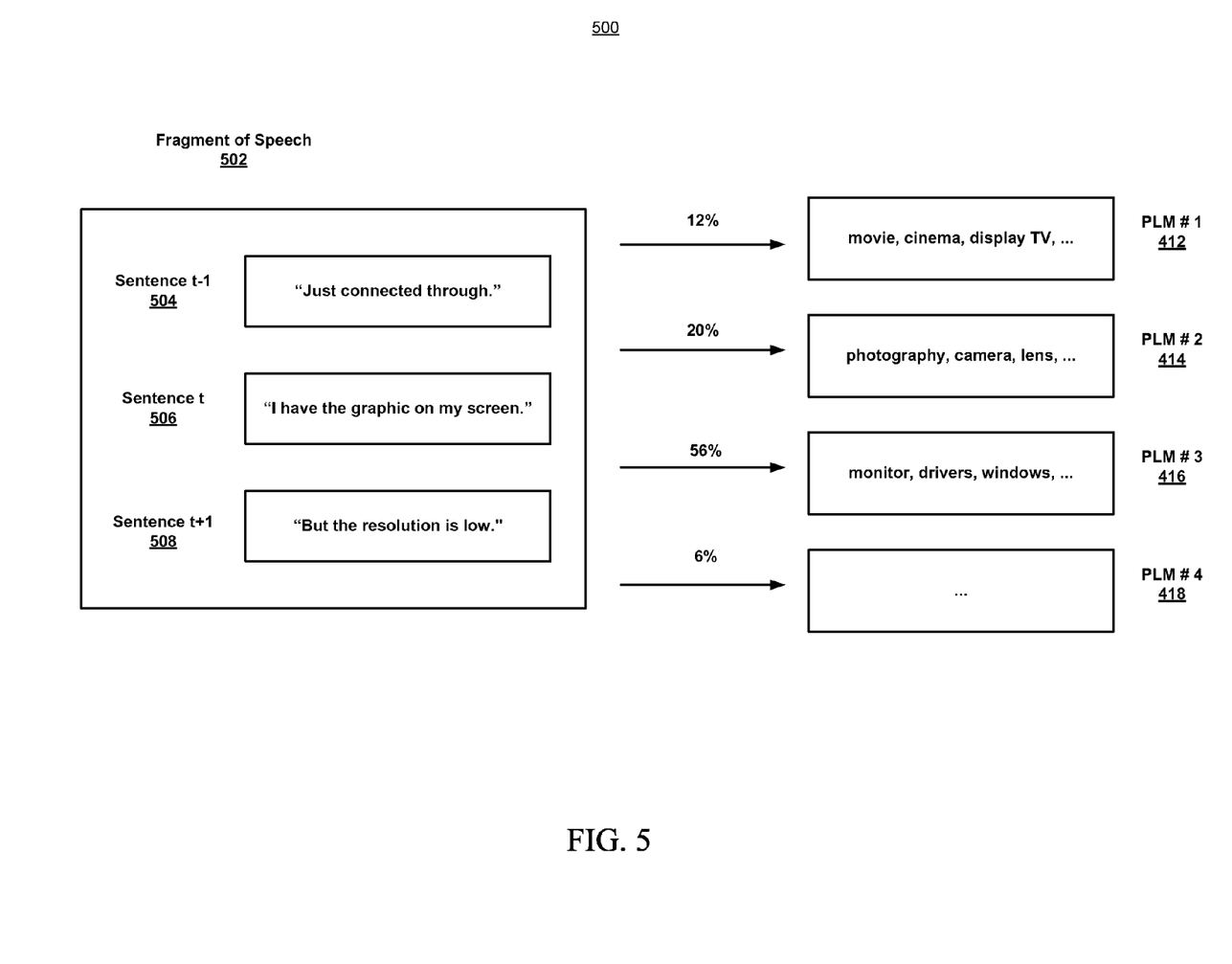
FIG. 5 illustrates language model usage consistent with one example embodiment of the present disclosure.

FIG. 5 illustrates personalized language model usage 500 consistent with one example embodiment of the present disclosure. Language model matching circuit 210 may be configured to associate text, generated in the first transcription by ASR circuit 208, to a PLM that best matches the current context of the conversation. The text may represent fragments of speech 502, such as, for example, phrases or sentences. In this simplified example, a current snippet of conversation includes three sentences 504, 506, 508:

"I just connected through."
"I have the graphic on my screen."
"But the resolution is low."

Sentence 504 represents a previously analyzed sentence at time t−1. Sentence 506 represents the sentence currently being analyzed at time t, and sentence 508 represents the following sentence at time t+1. Based on the context of neighboring sentences, language model matching circuit 210 decides that the current conversational context most likely relates to computer display hardware (for example with a confidence of 56%) and that PLM #3 416 may therefore provide the best results in a second transcription by ASR circuit 208.

FIG. 6 illustrates a sentence lattice 600 consistent with one example embodiment of the present disclosure. The second speech transcription by ASR circuit 208, using the PLM selected by language model matching circuit 210, results in a lattice of text sequence recognition possibilities, a simplified example of which is presented in FIG. 6. The lattice 600 includes a series of nodes 602, 604, 606, 608, 610 and 612 interconnected by paths associated with word choices and acoustic scores. Many possible phrases or sentences may be derived from this lattice including the following examples:

" . . . have glasses on my screen . . . "
" . . . have a graphic on my screen . . . "
" . . . and grass on my hand . . . "

As previously described, lattice pruning circuit 212 may be configured to remove paths from the lattice with relatively lower acoustic scores. A final selection needs to be made from the remaining paths, however, and this is performed by semantic analysis circuit 214 as described below.

Figure 7:
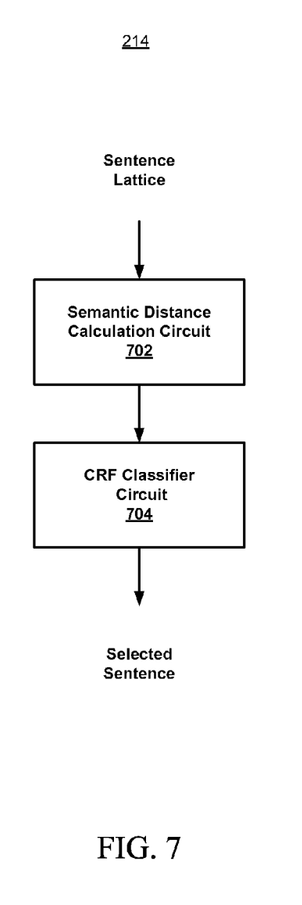
FIG. 7 illustrates a block diagram of another example embodiment consistent with the present disclosure.

FIG. 7 illustrates a block diagram 214 of another example embodiment consistent with the present disclosure. Semantic analysis circuit 214 is shown to include semantic distance calculation circuit 702 and conditional random filed (CRF) classifier circuit 704. Continuing with the previous examples of conversational sentences from FIG. 5 and the lattice of FIG. 6, it would be readily apparent to most humans that the sentence " . . . have a graphic on my screen . . . " is the most likely choice in the lattice based on the current conversational context relating to "connecting to a meeting but experiencing low screen resolution."

The semantic distance calculation circuit 702 may be configured to perform a similar function by estimating a semantic distance between each of the paths of estimated text sequences to one or more previously recognized phrases of speech from the conversation. In other words, a measure of how well the current sentence can be inferred from an earlier sentence can be made. This may be accomplished using any of a number of known techniques or tools. For example, vector based methods can convert each word or sentence to a vector representation and then semantic similarity can be measured by algebraic vector similarity metrics such as the Cosine Distance metric. The choices with the lowest semantic distance are likely to be the best choices.

Additional processing may be performed by conditional random field (CRF) classifier circuit 704 to further narrow down the lattice possibilities to make the final choice. CRF circuit 704 may be configured to rank each of the paths of estimated text sequences based on contextual relationships between the words in the paths. One example of a relationship that can be exploited for this purpose involves rules of grammar. For example, a noun often follows an adjective (e.g., "nice house"). Of course other any other suitable types of contextual relationship may be used.

The semantic analysis circuit 214 may thus select one of the paths of estimated text sequences, from the lattice, as a currently recognized phrase of speech from the conversation, based on the semantic distance and the CRF ranking.

Figure 8:
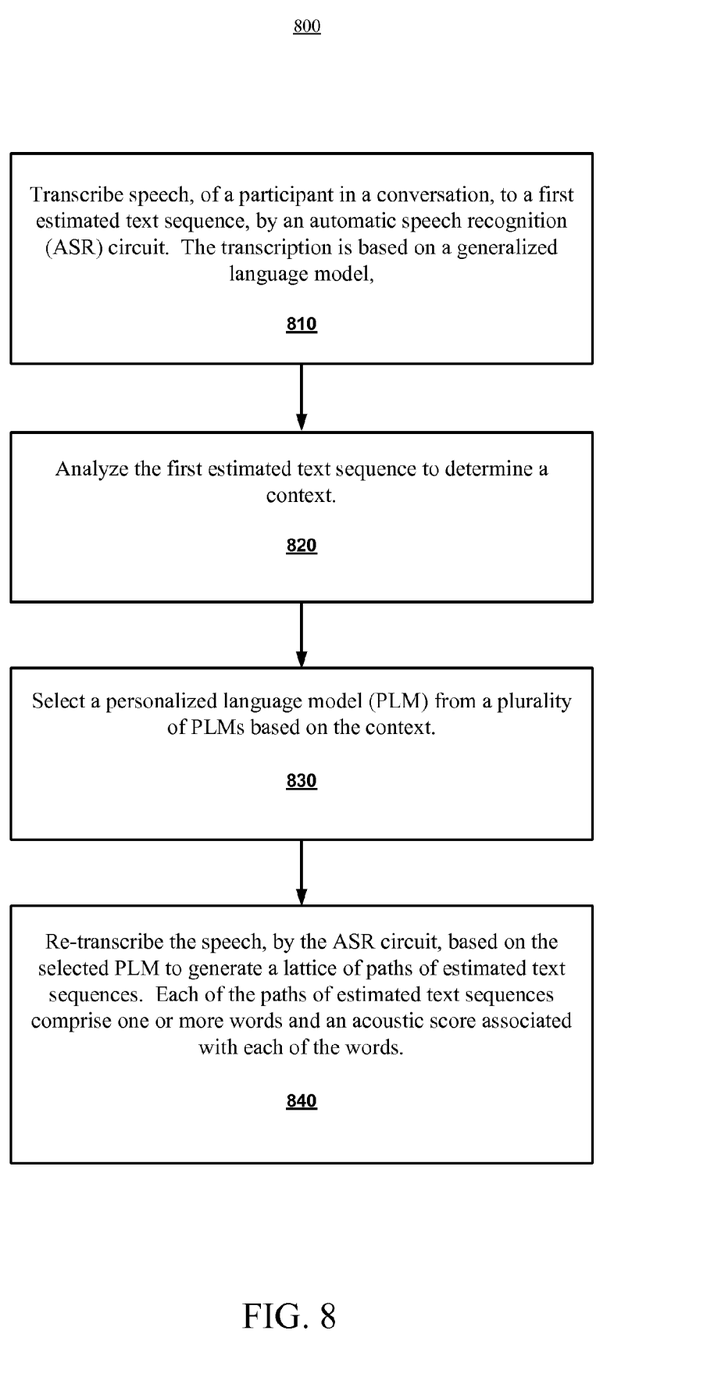
FIG. 8 illustrates a flowchart of operations of another example embodiment consistent with the present disclosure.

FIG. 8 illustrates a flowchart of operations 800 of another example embodiment consistent with the present disclosure. The operations provide a method for recognizing phrases of speech from a conversation. At operation 810, speech of a participant in the conversation is transcribed to a first estimated text sequence, by an automatic speech recognition (ASR) circuit. The transcription is based on a generalized language model. At operation 820, the first estimated text sequence is analyzed to determine a context. At operation 830, a personalized language model (PLM) is selected from a plurality of PLMs based on the context. At operation 840, the speech is re-transcribed by the ASR circuit, based on the selected PLM, to generate a lattice of paths of estimated text sequences. Each of the paths of estimated text sequences comprise one or more words and an acoustic score associated with each of the words.

Figure 9:
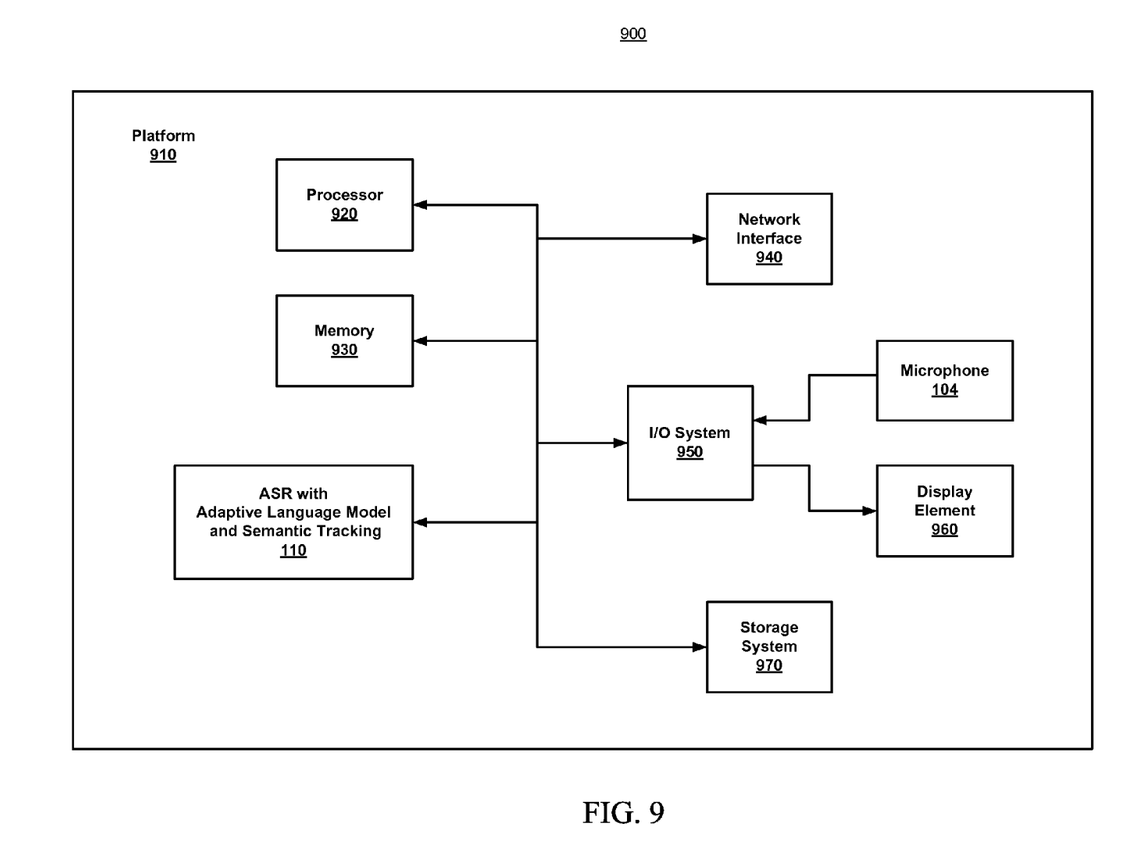
FIG. 9 illustrates a system diagram of a platform of another example embodiment consistent with the present disclosure.

FIG. 9 illustrates a system diagram 900 of one example embodiment consistent with the present disclosure. The system 900 may be a platform 910 hosting a communication and/or computing device such as, for example, a smart phone, smart tablet, personal digital assistant (PDA), mobile Internet device (MID), convertible tablet, notebook or laptop computer, workstation or desktop computer.

The system 900 is shown to include one or more processors 920 and memory 930. In some embodiments, the processors 920 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 930 may be coupled to the processors. The memory 930 may be any of a wide variety of memories (including various layers of memory hierarchy and/or memory caches) as are known or otherwise available to those of skill in the art. It will be appreciated that the processors and memory may be configured to store, host and/or execute one or more operating systems, user applications or other software. The applications may include, but not be limited to, for example, any type of computation, communication, data management, data storage and/or user interface task. In some embodiments, these applications may employ or interact with any other components of the platform 910.

System 900 is also shown to include an ASR circuit 110 configured to provide an adaptive language model and semantic tracking, as described previously.

System 900 is also shown to include network interface circuit 940 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 900 is also shown to include an input/output (IO) system or controller 950 which may be configured to enable or manage data communication between processor 920 and other elements of system 900 or other elements (not shown) external to system 900. The system may generally present various interfaces to a user via a display element 960 such as, for example, a touch screen, liquid crystal display (LCD) or any other suitable display type. Audio may be received through microphone 104, particularly for use by ASR circuit 110. System 900 is also shown to include a storage system 970, for example a hard disk drive (HDD) or solid state drive (SSD), coupled to the processor 920.

It will be appreciated that in some embodiments, the various components of the system 900 may be combined in a system-on-a-chip (SoC) architecture. In some embodiments, the components may be hardware components, firmware components, software components or any suitable combination of hardware, firmware or software.

"Circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for adaptation of language models and semantic tracking to improve automatic speech recognition (ASR). The following examples pertain to further embodiments.

According to Example 1 there is provided a system for recognizing phrases of speech from a conversation. The system may include an automatic speech recognition (ASR) circuit to transcribe speech, of a user of the system, to a first estimated text sequence, based on a generalized language model; a language model matching circuit to analyze the first estimated text sequence to determine a context and to select a personalized language model (PLM), from a plurality of PLMs, based on the context; and the ASR circuit further configured to re-transcribe the speech based on the selected PLM to generate a lattice of paths of estimated text sequences, and each of the paths of estimated text sequences include one or more words and an acoustic score associated with each of the words.

Example 2 may include the subject matter of Example 1, further including a lattice pruning circuit to remove a subset of the paths of estimated text sequences based on a comparison of the acoustic scores to a threshold value.

Example 3 may include the subject matter of Examples 1 and 2, further including a semantic distance calculation circuit to estimate a semantic distance between each of the paths of estimated text sequences to one or more previously recognized phrases of speech from the conversation.

Example 4 may include the subject matter of Examples 1-3, further including a conditional random field (CRF) classifier circuit to rank each of the paths of estimated text sequences based on contextual relationships between the words in the paths.

Example 5 may include the subject matter of Examples 1-4, further including a semantic analysis circuit to select one of the paths of estimated text sequences, from the lattice, as a currently recognized phrase of speech from the conversation, based on the semantic distance and the CRF ranking.

Example 6 may include the subject matter of Examples 1-5, further including a PLM generation circuit to analyze textual information sources associated with the user; to organize the textual information from the sources into clusters based on a measurement of content similarity between the sources, to generate domains of knowledge based on the clusters; and to map the domains into the plurality of PLMs.

Example 7 may include the subject matter of Examples 1-6, and the textual information sources include electronic documents, emails, text messages or social media communications.

Example 8 may include the subject matter of Examples 1-7, and the PLM generation circuit operates in an offline mode prior to execution of the ASR circuit.

Example 9 may include the subject matter of Examples 1-8, further including an insight extraction circuit to analyze the current and previously recognized phrases of speech from the conversation and to generate a summary of the conversation, extract keywords from the conversation, perform a translation of the conversation or extract action requests taken by the user during the conversation.

According to Example 10 there is provided a method for recognizing phrases of speech from a conversation. The method may include: transcribing speech, of a participant in the conversation, to a first estimated text sequence, by an automatic speech recognition (ASR) circuit, the transcription based on a generalized language model; analyzing the first estimated text sequence to determine a context; selecting a personalized language model (PLM), from a plurality of PLMs, based on the context; and re-transcribing the speech, by the ASR circuit, based on the selected PLM, to generate a lattice of paths of estimated text sequences, and each of the paths of estimated text sequences include one or more words and an acoustic score associated with each of the words.

Example 11 may include the subject matter of Example 10, further including removing a subset of the paths of estimated text sequences based on a comparison of the acoustic scores to a threshold value.

Example 12 may include the subject matter of Examples 10 and 11, further including estimating a semantic distance between each of the paths of estimated text sequences to one or more previously recognized phrases of speech from the conversation.

Example 13 may include the subject matter of Examples 10-12, further including determining contextual relationships between the words in the paths and ranking each of the paths of estimated text sequences based on the contextual relationships.

Example 14 may include the subject matter of Examples 10-13, further including selecting one of the paths of estimated text sequences, from the lattice, as a currently recognized phrase of speech from the conversation, based on the semantic distance and the ranking.

Example 15 may include the subject matter of Examples 10-14, further including generating the PLMs by: analyzing textual information sources associated with the participant; organizing the textual information from the sources into clusters based on a measurement of content similarity between the sources; generating domains of knowledge based on the clusters; and mapping the domains into the plurality of PLMs.

Example 16 may include the subject matter of Examples 10-15, and the textual information sources include electronic documents, emails, text messages or social media communications.

Example 17 may include the subject matter of Examples 10-16, and the PLM generation is performed in an offline mode prior to execution of the ASR circuit.

Example 18 may include the subject matter of Examples 10-17, further including analyzing the current and previously recognized phrases of speech from the conversation to generate a summary of the conversation, extract keywords from the conversation, perform a translation of the conversation or extract action requests taken by the participant during the conversation.

According to Example 19 there is provided at least one computer-readable storage medium having instructions stored thereon which when executed by a processor result in the following operations for recognizing phrases of speech from a conversation. The operations may include: transcribing speech, of a participant in the conversation, to a first estimated text sequence, by an automatic speech recognition (ASR) circuit, the transcription based on a generalized language model; analyzing the first estimated text sequence to determine a context; selecting a personalized language model (PLM), from a plurality of PLMs, based on the context; and re-transcribing the speech, by the ASR circuit, based on the selected PLM, to generate a lattice of paths of estimated text sequences, and each of the paths of estimated text sequences include one or more words and an acoustic score associated with each of the words.

Example 20 may include the subject matter of Example 19, further including removing a subset of the paths of estimated text sequences based on a comparison of the acoustic scores to a threshold value.

Example 21 may include the subject matter of Examples 19 and 20, further including estimating a semantic distance between each of the paths of estimated text sequences to one or more previously recognized phrases of speech from the conversation.

Example 22 may include the subject matter of Examples 19-21, further including determining contextual relationships between the words in the paths and ranking each of the paths of estimated text sequences based on the contextual relationships.

Example 23 may include the subject matter of Examples 19-22, further including selecting one of the paths of estimated text sequences, from the lattice, as a currently recognized phrase of speech from the conversation, based on the semantic distance and the ranking.

Example 24 may include the subject matter of Examples 19-23, further including generating the PLMs by: analyzing textual information sources associated with the participant; organizing the textual information from the sources into clusters based on a measurement of content similarity between the sources; generating domains of knowledge based on the clusters; and mapping the domains into the plurality of PLMs.

Example 25 may include the subject matter of Examples 19-24, and the textual information sources include electronic documents, emails, text messages or social media communications.

Example 26 may include the subject matter of Examples 19-25, and the PLM generation is performed in an offline mode prior to execution of the ASR circuit.

Example 27 may include the subject matter of Examples 19-26, further including analyzing the current and previously recognized phrases of speech from the conversation to generate a summary of the conversation, extract keywords from the conversation, perform a translation of the conversation or extract action requests taken by the participant during the conversation.

According to Example 28 there is provided a system for recognizing phrases of speech from a conversation. The system may include: means for transcribing speech, of a participant in the conversation, to a first estimated text sequence, by an automatic speech recognition (ASR) circuit, the transcription based on a generalized language model; means for analyzing the first estimated text sequence to determine a context; means for selecting a personalized language model (PLM), from a plurality of PLMs, based on the context; and means for re-transcribing the speech, by the ASR circuit, based on the selected PLM, to generate a lattice of paths of estimated text sequences, and each of the paths of estimated text sequences include one or more words and an acoustic score associated with each of the words.

Example 29 may include the subject matter of Example 28, further including means for removing a subset of the paths of estimated text sequences based on a comparison of the acoustic scores to a threshold value.

Example 30 may include the subject matter of Examples 28 and 29, further including means for estimating a semantic distance between each of the paths of estimated text sequences to one or more previously recognized phrases of speech from the conversation.

Example 31 may include the subject matter of Examples 28-30, further including means for determining contextual relationships between the words in the paths and ranking each of the paths of estimated text sequences based on the contextual relationships.

Example 32 may include the subject matter of Examples 28-31, further including means for selecting one of the paths of estimated text sequences, from the lattice, as a currently recognized phrase of speech from the conversation, based on the semantic distance and the ranking.

Example 33 may include the subject matter of Examples 28-32, further including means for generating the PLMs by: analyzing textual information sources associated with the participant; organizing the textual information from the sources into clusters based on a measurement of content similarity between the sources; generating domains of knowledge based on the clusters; and mapping the domains into the plurality of PLMs.

Example 34 may include the subject matter of Examples 28-33, and the textual information sources include electronic documents, emails, text messages or social media communications.

Example 35 may include the subject matter of Examples 28-34, and the PLM generation is performed in an offline mode prior to execution of the ASR circuit.

Example 36 may include the subject matter of Examples 28-35, further including means for analyzing the current and previously recognized phrases of speech from the conversation to generate a summary of the conversation, extract keywords from the conversation, perform a translation of the conversation or extract action requests taken by the participant during the conversation.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for recognizing phrases of speech from a conversation, said system comprising:
    an information gathering circuit to collect textual information associated with a user using general knowledge sources in combination with user textual information sources including electronic documents, emails, text messages and social media communications;
    a text clustering circuit to analyze said collected textual information and organize that information into clusters;
    a knowledge domain generation circuit to generate domains of knowledge based upon each cluster and to map those domains to a plurality of personalized language models (PLM) in an offline mode prior to automatic speech recognition (ASR) operation to generate said plurality of PLMs;
    a first ASR circuit to initially transcribe speech, of a user of said system, to a first estimated text sequence, based on a generalized language model;
    a language model matching circuit to analyze said first estimated text sequence to determine a context and to select a PLM, from said plurality of PLMs, based on said context;
    a second ASR circuit to re-transcribe said speech based on said selected PLM to generate a lattice of paths of estimated text sequences, wherein each of said paths of estimated text sequences comprise one or more words and an acoustic score associated with each of said words; and
    a semantic analysis circuit to select one of said paths of estimated text sequences, from said lattice, as a currently recognized phrase of speech from said conversation, wherein the semantic analysis circuit includes:
        a semantic distance calculation circuit to estimate a semantic distance between each of said paths of estimated text sequences to one or more previously recognized phrases of speech from said conversation, and
        a condition random field (CRF) classifier circuit to rank each of said paths of estimated text sequences based on contextual relationships between said words in said paths, and
        wherein the semantic analysis circuit selects one of said paths of estimated text sequences, from said lattice, as a currently recognized phrase of speech from said conversation, based on said semantic distance and subsequent said CRF ranking.

2. The system of claim 1, further comprising a lattice pruning circuit to remove a subset of said paths of estimated text sequences based on a comparison of said acoustic scores to a threshold value.

3. The system of claim 1,
    wherein the information gathering circuit, the text clustering circuit and the knowledge domain circuit are included in a PLM generation circuit, and
    wherein the PLM generation circuit is configured to:
        analyze the textual information sources associated with said user;
        organize said textual information from said sources into clusters based on a measurement of content similarity between said sources, to generate domains of knowledge based on said clusters; and
        map said domains into said plurality of PLMs.

4. The system of claim 3, wherein said PLM generation circuit operates in an offline mode prior to execution of said ASR circuit.

5. The system of claim 1, further comprising an insight extraction circuit to analyze said current and previously recognized phrases of speech from said conversation and to generate a summary of said conversation, extract keywords from said conversation, perform a translation of said conversation or extract action requests taken by said user during said conversation.

6. A method for recognizing phrases of speech from a conversation, said method comprising:
    collecting, by an information gathering circuit, textual information associated with a participant using general knowledge sources in combination with participant textual information sources including electronic documents, emails, text messages and social media communications;
    analyzing collected textual information by a text clustering circuit;
    organizing said textual information into clusters by said text clustering circuit;
    generating, by a knowledge domain generation circuit, domains of knowledge based upon said clusters;
    mapping, by said knowledge domain generating circuit, said knowledge domains to a plurality of personalized language models (PLMs) in an offline mode prior to automatic speech recognition (ASR) operation to generate said plurality of PLMs;
    transcribing speech, of a participant in said conversation, to a first estimated text sequence, by a first ASR circuit, said transcription based on a generalized language model;
    analyzing said first estimated text sequence to determine a context;
    selecting a PLM, from said plurality of PLMs, based on said context;
    re-transcribing said speech, by said ASR circuit, based on said selected PLM, to generate a lattice of paths of estimated text sequences, wherein each of said paths of estimated text sequences comprise one or more words and an acoustic score associated with each of said words;
    estimating a semantic distance between each of said paths of estimated text sequences to one or more previously recognized phrases of speech from said conversation;
    ranking each of said paths of estimated text sequences based on determining contextual relationships between said words in said paths; and
    selecting one of said paths of estimated text sequences, from said lattice, as a currently recognized phrase of speech from said conversation, based on said semantic distance and subsequent said ranking.

7. The method of claim 6, further comprising removing a subset of said paths of estimated text sequences based on a comparison of said acoustic scores to a threshold value.

8. The method of claim 6, wherein said plurality of PLMs are generated by:
    analyzing the textual information sources associated with said participant;
    organizing said textual information from said sources into clusters based on a measurement of content similarity between said sources;
    generating domains of knowledge based on said clusters; and
    mapping said domains into said plurality of PLMs.

9. The method of claim 8, wherein said PLM generation is performed in an offline mode prior to execution of said ASR circuit.

10. The method of claim 6, further comprising analyzing said current and previously recognized phrases of speech from said conversation to generate a summary of said conversation, extract keywords from said conversation, perform a translation of said conversation or extract action requests taken by said participant during said conversation.

11. At least one non-transitory computer-readable storage medium having instructions stored thereon which when executed by a processor result in the following operations for recognizing phrases of speech, said operations comprising:
    collecting, by an information gathering circuit, textual information associated with a participant using general knowledge sources in combination with participant textual information sources including electronic documents, emails, text messages and social media communications;
    analyzing said collected textual information by a text clustering circuit;
    organizing, by said text clustering circuit, said textual information into clusters;
    generating, by a knowledge domain generation circuit, domains of knowledge based upon said clusters;
    mapping, by said knowledge domain generation circuit, said knowledge domains to a plurality of personalized language models (PLMs) in an offline mode prior to automatic speech recognition (ASR) operation to generate said plurality of PLMs;
    transcribing speech, of a participant in said conversation, to a first estimated text sequence, by a first ASR circuit, said transcription based on a generalized language model;
    analyzing said first estimated text sequence to determine a context;
    selecting a PLM, from said plurality of PLMs, based on said context; and re-transcribing said speech, by a second ASR circuit, based on said selected PLM, to generate a lattice of paths of estimated text sequences, wherein each of said paths of estimated text sequences comprise one or more words and an acoustic score associated with each of said words and
    estimating a semantic distance between each of said paths of estimated text sequences to one or more previously recognized phrases of speech from said conversation;
    ranking each of said paths of estimated text sequences based on determining contextual relationships between said words in said paths; and
    selecting one of said paths of estimated text sequences, from said lattice, as a currently recognized phrase of speech from said conversation, based on said semantic distance and subsequent said ranking.

12. The computer-readable storage medium of claim 11, further comprising removing a subset of said paths of estimated text sequences based on a comparison of said acoustic scores to a threshold value.

13. The computer-readable storage medium of claim 11, wherein said plurality of PLMs are generated by:
    analyzing the textual information sources associated with said participant;
    organizing said textual information from said sources into clusters based on a measurement of content similarity between said sources;
    generating domains of knowledge based on said clusters; and
    mapping said domains into said plurality of PLMs.

14. The computer-readable storage medium of claim 13, wherein said PLM generation is performed in an offline mode prior to execution of said ASR circuit.

15. The computer-readable storage medium of claim 11, further comprising analyzing said current and previously recognized phrases of speech from said conversation to generate a summary of said conversation, extract keywords from said conversation, perform a translation of said conversation or extract action requests taken by said participant during said conversation.

* * * * *